US008356278B2

(12) United States Patent
Drissi et al.

(10) Patent No.: US 8,356,278 B2
(45) Date of Patent: *Jan. 15, 2013

(54) METHOD, SYSTEM AND PROGRAM PRODUCT FOR DETECTING DEVIATION FROM SOFTWARE DEVELOPMENT BEST PRACTICE RESOURCE IN A CODE SHARING SYSTEM

(75) Inventors: Youssef Drissi, Ossining, NY (US); Tong-Haing Fin, Harrison, NY (US); Moon Ju Kim, Wappinggers Parks, NY (US); Lev Koaakov, Stamford, CT (US); Juan Leon Rodriquez, Waterbury, CT (US)

(73) Assignee: International Business Machines Corporation, Armonk, NY (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/556,924

(22) Filed: Sep. 10, 2009

(65) Prior Publication Data

US 2010/0005446 A1   Jan. 7, 2010

Related U.S. Application Data

(63) Continuation of application No. 10/814,925, filed on Mar. 31, 2004, now Pat. No. 7,647,579.

(51) Int. Cl.
  *G06F 9/44* (2006.01)
(52) U.S. Cl. ........ 717/114; 717/101; 717/102; 717/103; 717/126
(58) Field of Classification Search .................. None
See application file for complete search history.

(56) References Cited

U.S. PATENT DOCUMENTS

| | | | |
|---|---|---|---|
| 5,943,670 A * | 8/1999 | Prager .................................... 1/1 |
| 6,415,434 B1 * | 7/2002 | Kind .............................. 717/107 |
| 6,490,721 B1 | 12/2002 | Gorshkov et al. |
| 6,539,542 B1 * | 3/2003 | Cousins et al. ............... 717/151 |
| 6,658,642 B1 | 12/2003 | Megiddo et al. |
| 6,697,965 B1 | 2/2004 | Shimada |
| 7,546,577 B2 * | 6/2009 | Do et al. ........................ 717/108 |

(Continued)

FOREIGN PATENT DOCUMENTS

EP   1202166 A1   5/2005

(Continued)

OTHER PUBLICATIONS

Larson et al., "Managing Software Requirements in the Context of the Scientific Enterprise", IEEE, 14 pages.
Ghosh et al., "An Automated Approach for Identifying Potential Vulnerabilities in Software", May 3-6, 1998, Abstract, 1 page.
Kang, U.S. Appl. No. 10/814,925, Notice of Allowance & Fees Due, Aug. 24, 2009, 11 pages.

(Continued)

*Primary Examiner* — Insun Kang
(74) *Attorney, Agent, or Firm* — William E. Schiesser; Hoffman Warnick LLC (57) ABSTRACT

Under the present invention, a best practice violation (BPV) engine resource is first built. This typically occurs by: receiving sets of source code from a plurality of sources; detecting a programming language of each of the sets of source code; extracting code patterns from the sets of source code; defining meta data for each code pattern that indicates a quality thereof, classifying each code pattern; and assigning a rank to each of the code pattern based on it's corresponding meta data as well as a skill level and an experience level of the developer thereof. Once the BPV engine resource is built, it will be used to detect best practice violations in other sets of source code.

22 Claims, 3 Drawing Sheets

U.S. PATENT DOCUMENTS

| | | | |
|---|---|---|---|
| 7,743,365 B2 * | 6/2010 | Wehrs et al. | 717/124 |
| 7,778,866 B2 * | 8/2010 | Hughes | 705/7.42 |
| 2002/0055940 A1 | 5/2002 | Elkan | |
| 2002/0099730 A1 | 7/2002 | Brown et al. | |
| 2002/0133812 A1 | 9/2002 | Little et al. | |
| 2002/0156668 A1 | 10/2002 | Morrow et al. | |
| 2003/0018955 A1 | 1/2003 | Hayase et al. | |
| 2003/0056151 A1 | 3/2003 | Makiyama | |
| 2003/0115570 A1 | 6/2003 | Bisceglia | |
| 2003/0192029 A1 | 10/2003 | Hughes | |
| 2004/0117761 A1 | 6/2004 | Andrews et al. | |
| 2004/0243968 A1 * | 12/2004 | Hecksel | 717/100 |
| 2004/0268341 A1 * | 12/2004 | Kenworthy | 717/174 |
| 2005/0125422 A1 | 6/2005 | Hirst | |
| 2005/0160395 A1 | 7/2005 | Hughes | |
| 2005/0289140 A1 * | 12/2005 | Ford et al. | 707/5 |
| 2009/0030969 A1 * | 1/2009 | Dutta et al. | 709/201 |

FOREIGN PATENT DOCUMENTS

| | | |
|---|---|---|
| JP | 09185528 | 8/1996 |

OTHER PUBLICATIONS

Kang, U.S. Appl. No. 10/814,925, Office Action Communication, Feb. 24, 2009, 9 pages.

Kang, U.S. Appl. No. 10/814,925, Office Action Communication, Oct. 16, 2008, 11 pages.

Kang, U.S. Appl. No. 10/814,925, Office Action Communication, Apr. 4, 2008, 18 pages.

Robinson et al. "Requirements Interaction Management", ACM Computing Surveys, vol. 35, No. 2, Jun. 2003, pp. 132-190.

Johansson et al. "Tracking Degradation in Software Product Lines through Measurement of Design Rule Violations", SEKE, Jul. 15-19, 2002, Ischia, Italy, pp. 249-252.

Sekar et al. "Model-Carrying Code: A Practical Approach for Safe Execution of Untrusted Applications", SOSP, Oct. 19-22, 2003, Bolton Landing, New York, pp. 15-28.

Matsumura et al., "The Detection of Faulty Code Violating Implicit Coding Rules", Proceedings of the 2002 International Symposium on Empirical Software Engineering (ISESE '02).

* cited by examiner

FIG. 3

METHOD, SYSTEM AND PROGRAM PRODUCT FOR DETECTING DEVIATION FROM SOFTWARE DEVELOPMENT BEST PRACTICE RESOURCE IN A CODE SHARING SYSTEM

The current application is a continuation application of U.S. patent application Ser. No. 10/814,925 filed Mar. 31, 2004, which issued as U.S. Pat. No. 7,647,579 on Jan. 12, 2010, and which is hereby incorporated by reference.

FIELD OF THE INVENTION

In general, the present invention relates to a method, system and program product for detecting software development best practice violations. Specifically, the present invention provides a dynamically constructed best practice violation (BPV) engine resource that can be used to rank code patterns and detect software development best practice violations.

BACKGROUND OF THE INVENTION

As software development has become more pervasive, many tools within integrated development environments (IDEs) have been provided to detect compilation errors in source code written by developers. Some IDEs, such as Eclipse and WSAD, can detect less serious errors classified as a warning. One example of a warning notification is when a Java package is imported without being used. Another example, is the warning that occurs when a depreciated method is used by a developer. Each of these types of detection methods represents a static approach to error detection. Specifically, the source code is typically analyzed based on a known reference or policy. Moreover, these existing approaches fail to analyze the quality of a set of source code. That is, a set of source code might not have any compilation errors, but it still might not represent the best approach to the desired functionality. As known, there is often many ways to code a single function. A developer should generally select the method that is the most efficient and consumes the least amount resources of the target system. Existing systems fail to monitor the quality of source code in such a manner.

These shortcomings are especially unfortunate in a shared network environment such as a peer-to-peer network environment. In general, a peer-to-peer network environment is characterized by a large scale (e.g., thousands to millions of participants), intermittent user and resource participation, lack of trust and lack of centralized control. In a peer-to-peer network, developers can share source code they are developing with one another. This often provides great convenience for developers who wish to reuse code without duplicating effort. Unfortunately, no existing system fully harnesses the advantages of a shared network environment. Specifically, no system takes full advantage of the volume of developers, their expertise, and skill in evaluating source code.

In view of the foregoing, there exists a need for a method, system and program product for detecting software development best practice violations in a code sharing system. Specifically, a need exists for a system in which a dynamic best practice violation (BPV) engine resource is built based on sets of source code provided by the various developers in a code sharing system. Once built, a need exists for the BPV engine resource to be used to evaluate source code based on its quality as well as a skill level and an expertise level of its developer.

SUMMARY OF THE INVENTION

In general, the present invention provides a method, system and program product for detecting software development best practice violations in a code sharing system. Specifically, under the present invention, a best practice violation (BPV) engine resource is first built. This typically occurs by: receiving sets of source code from a plurality of sources; detecting a programming language of each of the sets of source code; extracting one or more code patterns from the sets of source code; defining meta data for each code pattern that indicates a quality thereof; classifying each code pattern; and assigning a rank to each code pattern based on its corresponding meta data as well as a skill level and an experience level of its developer.

Once the BPV engine resource is built, it will be used to detect best practice violations in other sets of source code. For example, a subsequent set of source code will be received. Upon reception a code pattern to be tested will be extracted therefrom and classified. Thereafter, the code pattern to be tested will be compared to the previously analyzed and ranked code patterns to determine a closest match. Once identified, the rank of the previously analyzed closest match will be assigned to the code pattern to be tested. A software development best practice violation will be detected if the rank assigned to the code pattern to be tested fails to comply with a predetermined threshold.

A first aspect of the present invention provides a method for detecting software development best practice violations, comprising: receiving sets of source code from a plurality of sources; extracting at least one code pattern from the sets of source code; defining meta data for each of the at least one code pattern that indicates a quality of the at least one code pattern; and assigning a rank to each of the at least one code pattern based on the corresponding meta data.

A second aspect of the present invention provides a method for building a dynamic best practice violation (BPV) engine resource for detecting software development best practice violations, comprising: receiving sets of source code from a plurality of sources; detecting a programming language of each of the sets of source code; extracting a plurality of code patterns from the sets of source code; defining meta data for each of the plurality of code patterns that indicates a quality of the plurality of code patterns; and classifying and assigning a rank to each of the plurality of code patterns based on the corresponding meta data.

A third aspect of the present invention provides a method for detecting software development best practice violations, comprising: receiving a first set of source code in a best practice violation (BPV) engine; extracting and classifying a code pattern to be tested from the first set of source code; comparing the code pattern to be tested to a plurality of code patterns extracted from other sets of source code previously received and analyzed by the BPV engine to determine a closest match to the code pattern to be tested; assigning a rank previously assigned to the closest match to the code pattern to be tested; and detecting a software development best practice violation if the rank assigned to the code pattern to be tested fails to comply with a predetermined threshold.

A fourth aspect of the present invention provides a system for building a dynamic best practice violation (BPV) engine resource for detecting software development best practice violations, comprising: a code reception system for receiving sets of source code from a plurality of sources; a language detection system for detecting a programming language of each of the sets of source code; a pattern extraction system for extracting a plurality of code patterns from the sets of source code; a code pattern analysis system for defining meta data for each of the plurality of code patterns that indicates a quality of the plurality of code patterns; and a classification and ranking system for classifying and assigning a rank to each of the plurality of code patterns based on the corresponding meta data.

A fifth aspect of the present invention provides a best practice violation (BPV) engine for detecting software development best practice violations, comprising: a test reception system for receiving a first set of source code; a test extraction system for extracting a code pattern to be tested from the first set of source code; a test classification system for classifying the code pattern to be tested; a matching system for comparing the code pattern to be tested to a plurality of code patterns extracted from other sets of source code previously received and analyzed by the BPV engine to determine a closest match to the code pattern to be tested, and for assigning a rank previously assigned to the closest match to the code pattern to be tested; and a deviation detection system for detecting a software development best practice violation if the rank assigned to the code pattern to be tested fails to comply with a predetermined threshold.

A sixth aspect of the present invention provides a program product stored on a recordable medium for building a dynamic best practice violation (BPV) engine resource for detecting software development best practice violations, which when executed, comprises: program code for receiving sets of source code from a plurality of sources; program code for detecting a programming language of each of the sets of source code; program code for extracting a plurality of code patterns from the sets of source code; program code for defining meta data for each of the plurality of code patterns that indicates a quality of the plurality of code patterns; and program code for classifying and assigning a rank to each of the plurality of code patterns based on the corresponding meta data.

A seventh aspect of the present invention provides a best practice violation (BPV) engine stored on a recordable medium for detecting software development best practice violations, which when executed, comprises: program code for receiving a first set of source code; program code for extracting a code pattern to be tested from the first set of source code; program code for classifying the code pattern to be tested; program code for comparing the code pattern to be tested to a plurality of code patterns extracted from other sets of source code previously received and analyzed by the BPV engine to determine a closest match to the code pattern to be tested, and for assigning a rank previously assigned to the closest match to the code pattern to be tested; and program code for detecting a software development best practice violation if the rank assigned to the code pattern to be tested fails to comply with a predetermined threshold.

An eighth aspect of the present invention provides a computer-implemented business method for detecting software development best practice violations, comprising: receiving a first set of source code in a best practice violation (BPV) engine from a subscriber; extracting and classifying a code pattern to be tested from the first set of source code; comparing the code pattern to be tested to a plurality of code patterns extracted from other sets of source code previously received and analyzed by the BPV engine to determine a closest match to the code pattern to be tested; assigning a rank previously assigned to the closest match to the code pattern to be tested; and detecting a software development best practice violation if the rank assigned to the code pattern to be tested fails to comply with a predetermined threshold.

Therefore, the present invention provides a method, system and program product for detecting software development best practice violations in a code sharing system.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections.
I. General Description
II. Best Practice Violation (BPV) Engine Resource
III. Best Practice Violation Detection
I. General Description As indicated above, the present invention provides a method, system and program product for detecting software development best practice violations in a code sharing system. Specifically, under the present invention, a best practice violation (BPV) engine resource is first built. This typically occurs by: receiving sets of source code from a plurality of sources; detecting a programming language of each of the sets of source code; extracting one or more code patterns from the sets of source code; defining meta data for each code pattern that indicates a quality thereof; classifying each code pattern; and assigning a rank to each code pattern based on its corresponding meta data as well as a skill level and an experience level of its developer.

Once the BPV engine resource is built, it will be used to detect best practice violations in other sets of source code. For example, a subsequent set of source code will be received. Upon reception a code pattern to be tested will be extracted therefrom and classified. Thereafter, the code pattern to be tested will be compared to the previously analyzed and ranked code patterns to determine a closest match. Once identified, the rank of the previously analyzed closest match will be assigned to the code pattern to be tested. A software development best practice violation will be detected if the rank assigned to the code pattern to be tested fails to comply with a predetermined threshold.
II. Best Practice Violation (BPV) Engine Resource Referring now to FIG. 1, a system 10 for detecting software development best practice violations is shown. As depicted, system 10 includes computer system 12, which communicates with nodes 60A-C in a code sharing system 64. In general, code sharing system 64 is intended to represent a peer-to-peer network environment. However, it should be appreciated that the teachings of the present invention could be utilized within any type of code sharing system. In addition, computer system 12 is intended to represent any type of computerized device capable of carrying out the functions described below. To this extent, computer system 12 could be a client, a server, another node in code sharing system 64, etc. As such, communication between nodes 60A-C and computer system 12 could occur over any type of network such as the Internet, a local area network (LAN), a wide area network (WAN), a virtual private network (VPN), etc. Such communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. These concepts also apply to communication among nodes 60A-C.

Figure 1:
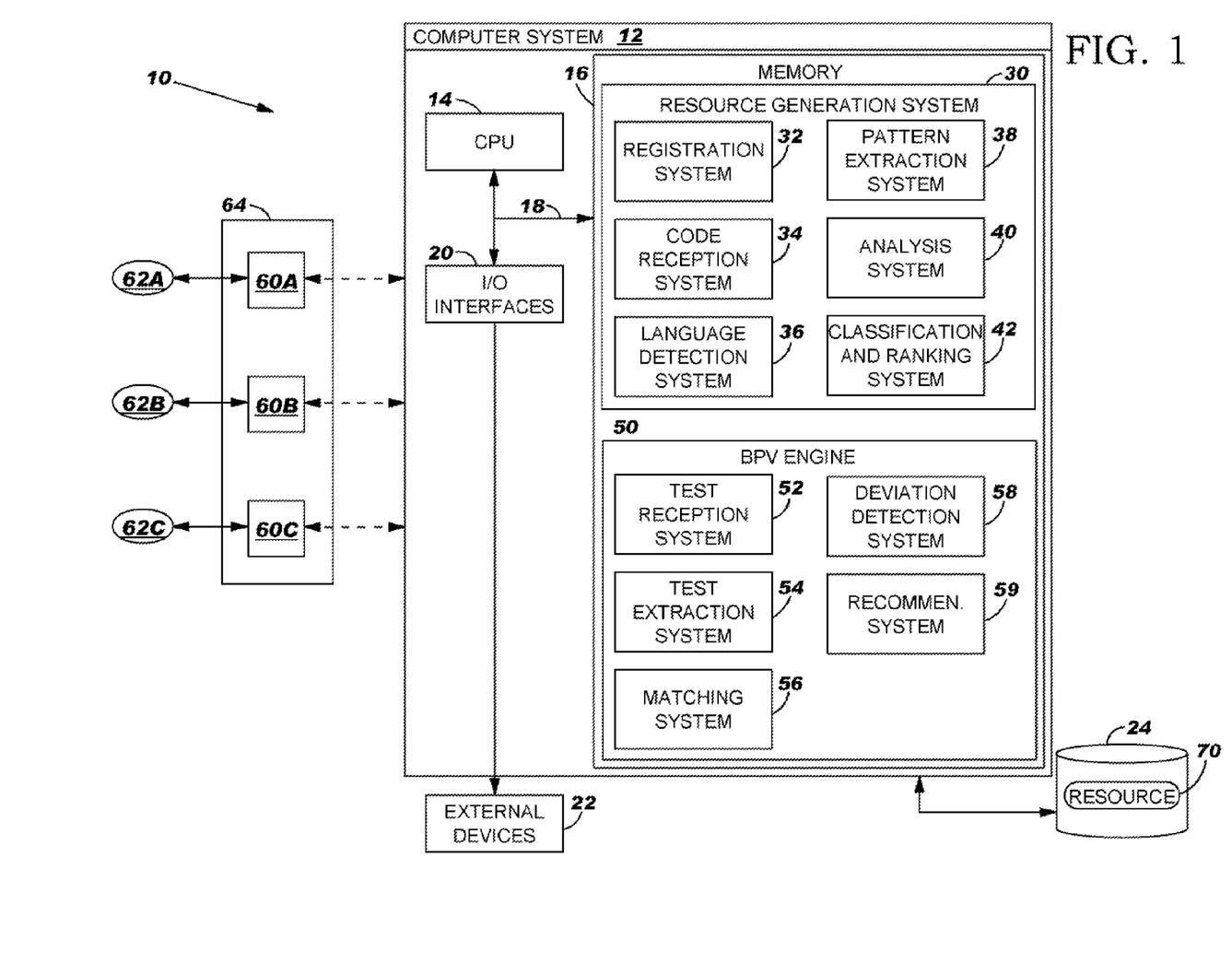
FIG. 1 depicts a system for detecting software development best practice violations in a code sharing system according to the present invention.

Computer system 12 generally comprises central processing unit (CPU) 14, memory 16, bus 18, input/output (I/O) interfaces 20, external devices/resources 22 and storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LCD screen, handheld device, keyboard, mouse, voice recognition system, speech output system, printer, monitor/display, facsimile, pager, etc. Bus 18 provides a communication link between each of the components in computer system 12 and likewise may comprise any known type of transmission link, including electrical, optical, wireless, etc.

Storage unit 24 can be any system (e.g., database) capable of providing storage for information under the present invention. Such information could include, for example, a BPV engine resource 70, codes patterns extracted from source code received from nodes 60A-C, etc. As such, storage unit 24 could include one or more storage devices, such as a magnetic disk drive or an optical disk drive. In another embodiment, storage unit 24 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 16 of computer system is resource generation system 30 and BPV engine 50. In a typical embodiment, resource generation system 30 generates a resource of code pattern rankings that will be used by BPV engine 50, which is then used to detect best practice violations in computer source code. In this Section, the functions of resource generation system 30 in generating resource 70 will be described. The subsequent use of resource 70 by BPV engine 50 to detect best practice violations will be described in Section III below.

In any event, as shown, resource generation system 30 includes registration system 32, code reception system 34, language detection system 36, pattern extraction system 38, analysis system 40 and classification and ranking system 42. Under the present invention, resource 70 is dynamic. That is, it changes based on the quality of sets of source code provide by developers 62A-C (nodes 60A-C), as well as based on the skill levels and experience levels of developers 62A-C. Before sets of source code are submitted to resource generation system 30, all participating nodes 60A-C and/or developers 62A-C will be registered via registration system 32. Typically, the registration process involves collecting contact or personal information from developers 62A-C, as well as an experience level (e.g., in years) and a skill level (e.g., novice, Ph.D., etc.) thereof. In addition, the registration process can involve collecting feedback about each developer 62A-C from the other developers 62A-C. For example, developers 62A-B could provide their opinion regarding the quality of developer 62C's source code.

Once a developer 62A-C has been registered, he/she can begin to submit source code. Accordingly, assume in this example, that developers 62A-C have all been registered. Each will then submit one or more sets of source code, which will be received by code reception system 34. Upon receipt, language detection system 36 will detect a programming language of each set of source code. Thereafter, pattern extraction system 38 will extract one or more known code patterns from each set of source code. This can be accomplished using any text pattern discovery technology now known or later developed.

Analysis system 40 will then analyze each of the extracted code patterns, and generate meta data relating to the quality thereof. To this extent, the meta data for a particular code pattern can identify certain characteristics thereof such as: the programming language of the code pattern; a list of the most used classes and elements in the code pattern instances; a list of dependencies (such as libraries and imported packages) of the code pattern; a number and a type of objects created and used at run time by the code pattern, memory used of the code pattern, etc. These variables allow the quality the code patterns to be determined.

Once the meta has been generated, classification and analysis system 42 will classify and rank the code patterns. For example, each code pattern could be classified according to its intended purpose, programming language, etc. Each classification/category of code patterns could also be assigned a group name. Classifying the code patterns is useful because, conceptually, the code patterns in the same category achieve the same results, but with varying levels of compliance to software best practices as well as different quality characteristics such as performance at run time and memory usage. Once classified, a rank or score is assigned to each code pattern based on at least three variables. Such variables include: (1) a skill level of the developer of the code pattern; (2) an experience level of the developer; and (3) a quality of the code pattern as set forth in the meta data (e.g., performance, memory usage, etc.). These variables will allow a composite score or rank to be determined. For example, each of the variables could be determined on a scale of 1-10 (with "1" being the best and "10" being the worst). The position on the scale could be based on a relative comparison to other developers or code patterns within the same class. For example, the developer with the most experience could be assigned the highest experience level. Alternatively, the position on the scale could be based on policies or rules. For example, a developer with 10 or more years of experience could have an experience level of "1." The same concepts could be applied in determining the skill and/or quality level. For example, a developer with a Ph.D. could have a skill level of "1," while a beginner student could have a skill lever of "10." Still yet, a code pattern that consumes very little memory could be assigned a quality level of "1."

Thus, assume developer 62A had skill score of "2" and an experience score of "3." Further assume that code pattern "X" developed by developer 62A has a quality score of "1." In this case, the code pattern would have a rank or score as follows:

$$6=2+3+1$$

Once all extracted code patterns have been ranked in this manner, they can be stored (e.g., in storage unit 24) as BPV engine resource 70 for future use by BPV engine 50. In a typically embodiment, resource 70 could resemble a table or chart of entries. Each entry could identify a particular code pattern and its corresponding rank. The entries could also set forth the details of the rank such as the skill, experience and quality levels that went into the rank.

III. Best Practice Violation Detection

Referring now to BPV engine 50, the use of resource 70 to detect best practice violations in source code will be described in greater detail. Specifically, as shown, BPV engine 50 includes test reception system 52, test extraction system 54, matching system 56, deviation detection system 58 and recommendation system 59. In this example, assume that developer 62B is now attempting to submit a new set of program code for evaluation. In this case, the set of program code will be received by test reception system 52. Upon receipt, test extraction system 54 will identify, extract and classify one or more code patterns to be tested therefrom. Identification of the code patterns can be accomplished using a similar text or pattern matching technology as described above in conjunction with pattern extraction system 38. Classification can also be performed as described above. For example, a code pattern to be tested could be classified based on its intended purpose, the programming language thereof, etc. Regardless, once the code patterns to be tested have been classified, matching system 56 will compare each code pattern to be tested to the code patterns in the same categories as set forth in resource 70 to determine a closest match. For example, if code pattern to be tested "Z" was determined to be in category "1," matching system 56 would compare it to all the previously analyzed and ranked code patterns in category "1" as set forth in resource 70. The code pattern in resource 70 most similar to code pattern "Z" would represent a "closest match." Once a closest match is found, matching system 56 would then assign the rank of the closest match (e.g., as set forth in resource 70) to the code pattern to be tested (e.g., assign it to code pattern "Z"). For example, if the closest match had a rank of "6" in resource 70, code pattern "Z" would be assigned the same rank of "6."

After a code pattern has been assigned a rank in this manner, deviation detection system 58 could detect best practice violations by comparing the score to a predetermined threshold. If the threshold is exceeded, a best practice violation would be detected. For example, assume that code pattern "Z" was assigned the rank of "6" and the predetermined threshold was "12." In this case, no best practice violations would be detected for code pattern "Z" because the threshold was not exceeded. If, however, the rank assigned to code pattern "Z" was "13" or higher, the threshold would be exceeded and a best practice violation would be detected. In such a case, recommendation system 59 would recommend one or more alternatives for code pattern "Z" that do not exceed the predetermined threshold. Such a recommendation could include other code patterns in the same category. It should be appreciated that resource 70 is dynamic meaning that it can continually change as source code is submitted. Thus, for example, the source code submitted by developer 62B can not only be tested for best practice violations, but it can also be analyzed by resource generation system 30, and used to update resource 70.

It should be understood that the scale and ranks used herein are intended to be illustrative only and that many variations could be implemented. For example, it could be the case the high end of a scale represents a best score while the lower end of the scale represents a worst score. In this case, the higher the value, the better the rank. In such a scenario, any ranks that fall below the predetermined threshold (as opposed to exceeding) would have best practice violations. For simplicity purposes, to accommodate both scenarios, a best practice violation will be detected when a rank fails to "comply" with the predetermined threshold.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 2:
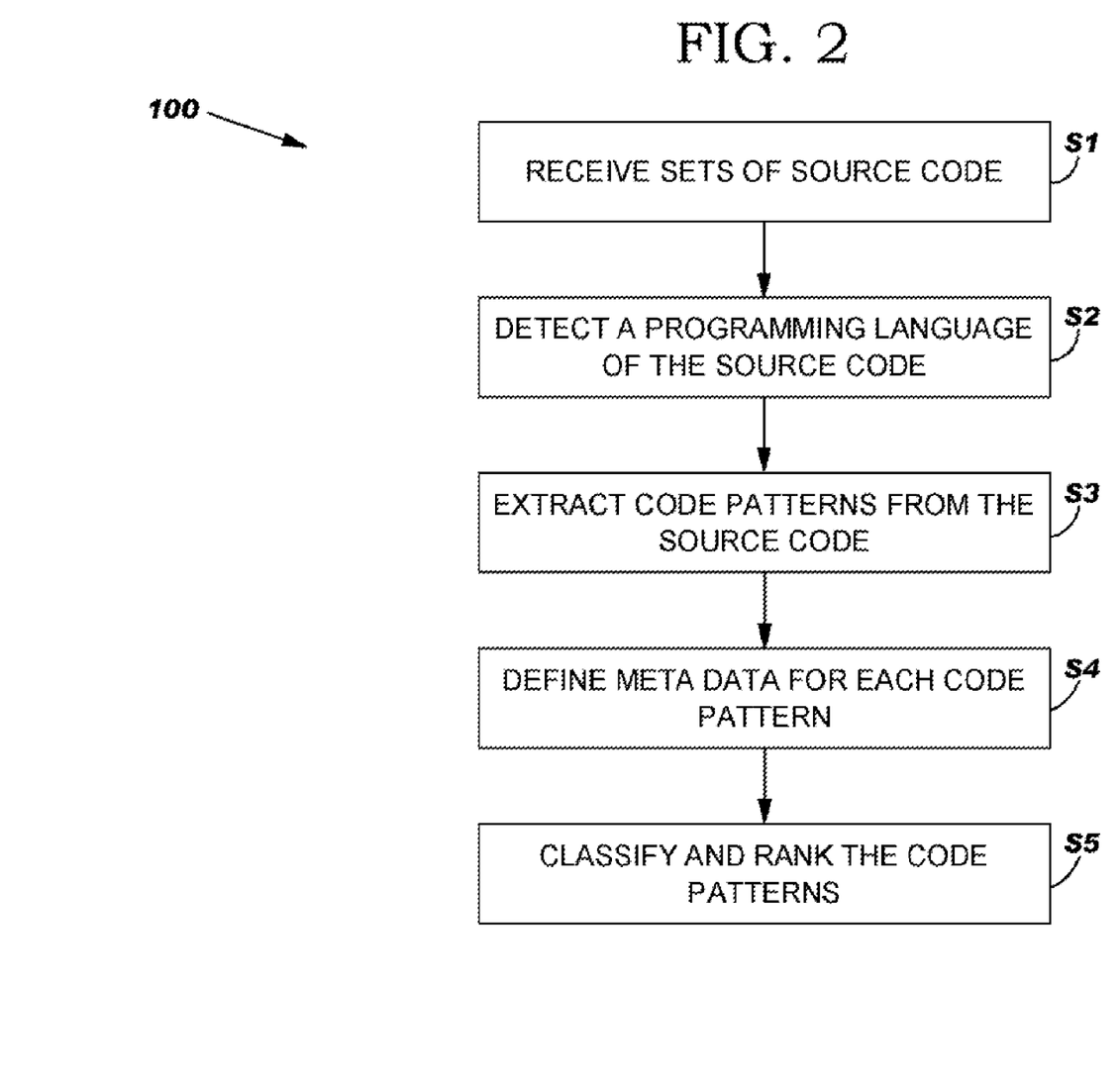
FIG. 2 depicts a flow diagram for building a best practice violation (BPV) engine resource according to the present invention.

Referring now to FIG. 2, a method flow diagram 100 depicting the steps involved with building the BPV engine resource are shown. As depicted, first step S1 of method 100 is to receive sets of source code from a plurality of sources. Second step S2 is to detect a programming language of each of the sets of source code. Third step S3 is to extract the code patterns from the sets of source code. Fourth step S4 is to define meta data for each of the extracted code patterns that indicates a quality thereof. Fifth step S5 is to classify and assign a rank to each of the plurality of code patterns based on the corresponding meta data as well as a skill level and an experience level of the developer thereof.

Figure 3:
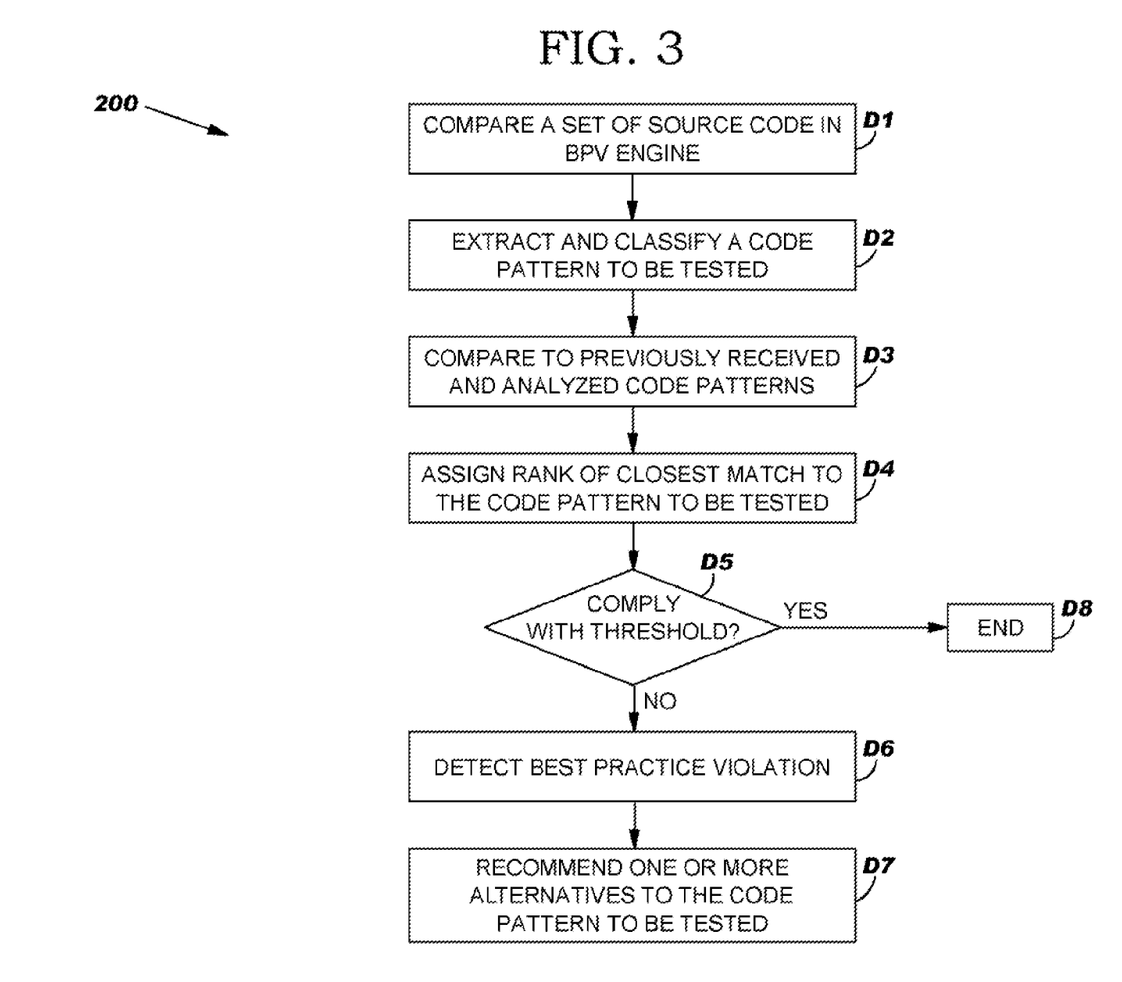
FIG. 3 depicts flow diagram for detecting best practice violations according to the present invention.

Referring now to FIG. 3, a method flow diagram 200 depicting the steps involved with using the BPV engine resource to detect best practice violations is shown. First step D1 is to receive a set of source code in a best practice violation (BPV) engine. Second step D2 is to extract and classify a code pattern to be tested from the set of source code. Third step D3 is to compare the code pattern to be tested to a plurality of code patterns extracted from other sets of source code previously received and analyzed by the BPV engine to determine a closest match to the code pattern to be tested. Fourth step D4 is to assign a rank previously assigned to the closest match to the code pattern to be tested. In step D5, it is determined whether the rank assigned to the code pattern to be tested complies with a predetermined threshold. If not, a best practice violation is detected in step D6, and one or more alternatives are recommended in step D7 before the process ends in step D8. However, if the rank complies with the predetermined threshold in step D5, the process can simply end in step D8. Although not shown, and as indicated above, the resource 70 can be updated as code patterns are tested.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of resource generation system 30 and BPV engine 50 shown in FIG. 1 are not intended to be limiting. That is, the functions of the present invention described herein could be represented by a different configuration of systems.

We claim:

1. A system for building a dynamic best practice violation (BPV) engine resource for detecting software development best practice violations, the system comprising:
   at least one computing device having a processor and a memory, the memory including:
   a code reception system for receiving sets of source code from a plurality of sources;
   a language detection system for detecting a programming language of each of the sets of source code;
   a pattern extraction system for extracting a plurality of code patterns from the sets of source code;
   a code pattern analysis system for defining meta data for each of the plurality of code patterns that indicates a quality of the plurality of code patterns;
   a classification and ranking system for classifying and assigning a rank to each of the plurality of code patterns based on the corresponding meta data;
   a storage system for storing each of the plurality of code patterns and the assigned ranks in a data structure;
   a test reception system for receiving a subsequent set of source code that is developed independently from the at least one code pattern stored in the data structure;
   a test extraction system for extracting and classifying a code pattern to be tested from the subsequent set of source code;
   a test classification system for classifying the code pattern to be tested;
   a matching system for comparing the code pattern to be tested to the plurality of code patterns to determine a closest match to the code pattern to be tested, and for assigning a rank of the closest match to the code pattern to be tested; and
   a deviation detection system for detecting a software development best practice violation if the rank assigned to the code pattern to be tested fails to comply with a predetermined threshold.

2. The system of claim 1, wherein the plurality of sources comprises a plurality of nodes interconnected in a peer-to-peer network environment, and wherein each of the plurality of nodes is operated by a developer.

3. The system of claim 2, the memory further including a registration system for registering the developers, prior to the receiving step.

4. The system of claim 3, wherein the registration system collects contact information, a skill level and an experience level corresponding to the developers.

5. The system of claim 4, wherein the registration system collects feedback information about each developer from the other developers.

6. The system of claim 1, wherein the rank is further assigned to each of the plurality of code patterns based on a skill level and an experience level of a developer of each of the sets of source code.

7. The system of claim 1, wherein the meta data for each of the plurality of code patterns identifies the programming language, a list of most used classes, a list of dependencies, a number and a type of objects created and used at run time, and memory usage of each of the plurality of code patterns.

8. The system of claim 1, wherein the memory further including a recommendation system for recommending at least one alternative to the code pattern to be tested if the deviation is detected.

9. A best practice violation (BPV) engine for detecting software development best practice violations, comprising:
   at least one computing device having a processor and a memory, the memory including:
   a test reception system for receiving a first set of source code;
   a test extraction system for extracting a code pattern to be tested from the first set of source code;
   a test classification system for classifying the code pattern to be tested;
   a matching system for comparing the code pattern to be tested to a plurality of code patterns extracted from other sets of source code previously received and analyzed by the BPV engine to determine a closest match to the code pattern to be tested, and for assigning a rank previously assigned to the closest match to the code pattern to be tested; and
   a deviation detection system for detecting a software development best practice violation if the rank assigned to the code pattern to be tested fails to comply with a predetermined threshold.

10. The BPV engine of claim 9, the memory further including a recommendation system for recommending at least one alternative to the code pattern to be tested if the deviation is detected.

11. The BPV engine of claim 9, wherein the rank of the closest match is determined based on a quality of the closest match, and a skill level and an experience level of a developer of the closest match.

12. A program product stored on a non-transitory recordable medium for building a dynamic best practice violation (BPV) engine resource for detecting software development best practice violations, which when executed, comprises:
   program code for receiving sets of source code from a plurality of sources;
   program code for detecting a programming language of each of the sets of source code;
   program code for extracting a plurality of code patterns from the sets of source code;
   program code for defining meta data for each of the plurality of code patterns that indicates a quality of the plurality of code patterns;
   program code for classifying and assigning a rank to each of the plurality of code patterns based on the corresponding meta data;
   program code for receiving a subsequent set of source code;
   program code for a code pattern to be tested from the subsequent set of source code;
   program code for classifying the code pattern to be tested;
   program code for comparing the code pattern to be tested to the plurality of code patterns to determine a closest match to the code pattern to be tested, and for assigning a rank of the closest match to the code pattern to be tested; and program code for detecting a software development best practice violation if the rank assigned to the code pattern to be tested fails to comply with a predetermined threshold.

13. The program product of claim 12, wherein the plurality of sources comprises a plurality of nodes interconnected in a peer-to-peer network environment, and wherein each of the plurality of nodes is operated by a developer.

14. The program product of claim 13, further comprising program code for registering the developers, prior to the receiving step.

15. The program product of claim 14, wherein the program code for registering collects contact information, a skill level and an experience level corresponding to the developers.

16. The program product of claim 15, wherein the program code for registering collects feedback information about each developer from the other developers.

17. The program product of claim 12, wherein the rank is further assigned to each of the plurality of code patterns based on a skill level and an experience level of a developer of each of the sets of source code.

18. The program product of claim 12, wherein the meta data for each of the plurality of code patterns identifies the programming language, a list of most used classes, a list of dependencies, a number and a type of objects created and used at run time, and memory usage of each of the plurality of code patterns.

19. The program product of claim 12, further comprising program code for recommending at least one alternative to the code pattern to be tested if the deviation is detected.

20. A best practice violation (BPV) engine stored on a non-transitory recordable medium for detecting software development best practice violations, which when executed, comprises:

program code for receiving a first set of source code;

program code for extracting a code pattern to be tested from the first set of source code;

program code for classifying the code pattern to be tested;

program code for comparing the code pattern to be tested to a plurality of code patterns extracted from other sets of source code previously received and analyzed by the BPV engine to determine a closest match to the code pattern to be tested, and for assigning a rank previously assigned to the closest match to the code pattern to be tested; and program code for detecting a software development best practice violation if the rank assigned to the code pattern to be tested fails to comply with a predetermined threshold.

21. The BPV engine of claim 20, further comprising program code for recommending at least one alternative to the code pattern to be tested if the deviation is detected.

22. The BPV engine of claim 20, wherein the rank of the closest match is determined based on a quality of the closest match, and a skill level and an experience level of a developer of the closest match.

* * * * *